United States Patent
Pillukat

(10) Patent No.: US 8,860,951 B2
(45) Date of Patent: *Oct. 14, 2014

(54) METHOD AND APPARATUS FOR THE RADIOMETRIC MEASUREMENT OF OBJECT POINTS ON SURFACES OF ASTRONOMICAL BODIES

(75) Inventor: Alexander Pillukat, Jena (DE)

(73) Assignee: Jena-Optronik GmbH, Jena (DE)

(*) Notice: Subject to any disclaimer, the term of this patent is extended or adjusted under 35 U.S.C. 154(b) by 501 days.

This patent is subject to a terminal disclaimer.

(21) Appl. No.: 13/208,657

(22) Filed: Aug. 12, 2011

(65) Prior Publication Data

US 2012/0038933 A1    Feb. 16, 2012

(30) Foreign Application Priority Data

Aug. 12, 2010 (DE) .................... 10 2010 034 319

(51) Int. Cl.
*G01B 11/24* (2006.01)
*H04N 3/08* (2006.01)
*G01C 11/02* (2006.01)
*H04N 5/341* (2011.01)

(52) U.S. Cl.
CPC .............. *H04N 5/341* (2013.01); *H04N 3/08* (2013.01); *G01C 11/025* (2013.01)
USPC ............................ 356/601; 356/614; 356/625

(58) Field of Classification Search
CPC .......... H04N 2201/04729; H04N 3/08; H04N 5/341; G01C 11/025
See application file for complete search history.

(56) References Cited

U.S. PATENT DOCUMENTS

| | | | | |
|---|---|---|---|---|
| 4,554,585 A | * | 11/1985 | Carlson | 348/342 |
| 5,028,998 A | * | 7/1991 | Westell | 348/145 |
| 5,481,479 A | * | 1/1996 | Wight et al. | 701/466 |
| 6,122,078 A | * | 9/2000 | Leberl et al. | 250/208.1 |
| 7,778,534 B2 | * | 8/2010 | Won et al. | 348/147 |
| 7,796,153 B1 | * | 9/2010 | Sanderson et al. | 348/145 |
| 2007/0242135 A1 | | 10/2007 | Rosenblum et al. | |

FOREIGN PATENT DOCUMENTS

| | | |
|---|---|---|
| DE | 103 54 752 A1 | 8/2004 |
| DE | 10 2008 030 727 A1 | 12/2009 |
| WO | WO 2007/130871 A2 | 11/2007 |

OTHER PUBLICATIONS

Chen et al., "Development and Calibration of the Airborne Three-Line Scanner (TLS) imaging system", Photogrammetric Engineering & remote sensing vol. 69, No. 1, Jan. 2003, pp. 71-78.*

Gruen et al., "Sensor Modeling for Aerial Mobile Mapping with Three-Line-Scanner (TLS) Imagery", ISPRS Commision II Symposium, Integrated System for spatial Data Production, Custodian and Decision Support, Aug. 20-23, 2002.*

* cited by examiner

*Primary Examiner* — Tarifur Chowdhury
*Assistant Examiner* — Juan D Valentin, II
(74) *Attorney, Agent, or Firm* — Duane Morris LLP

(57) ABSTRACT

The invention is directed to a method and an apparatus for air-borne or space-borne radiometric measurement of object points present in an object scene on the surface of an astronomical body which are assigned to rows and columns of an object matrix during a scanning progressing systematically in a first scanning direction and a second scanning direction, wherein the object matrix points are imaged on a detector in an image plane generated by optics, and the image inside the image plane is recorded by at least one radiation-sensitive detector element of the detector.

16 Claims, 7 Drawing Sheets

METHOD AND APPARATUS FOR THE RADIOMETRIC MEASUREMENT OF OBJECT POINTS ON SURFACES OF ASTRONOMICAL BODIES

RELATED APPLICATIONS

The present application claims priority benefit of German Application No. DE 10 2010 034 319.6 filed on Aug. 12, 2010, the contents of which are incorporated herein by reference in their entirety.

FIELD OF THE INVENTION

The invention is directed to a method and an apparatus for air-borne or space-borne radiometric measurement of object points present in an object scene on the surface of an astronomical body which are assigned to rows and columns of an object matrix during a scanning progressing systematically in a first scanning direction and a second scanning direction, wherein the object matrix points are imaged on a detector in an image plane generated by optics, and the image inside the image plane is recorded by at least one radiation-sensitive detector element of the detector.

BACKGROUND OF THE INVENTION

In the radiometric measurement of object points on the surface of an astronomical body conducted from platforms such as aircraft, spacecraft or satellites, the problem regularly posed is that of how to correct distortion in the image points of the object points which is caused, for example, by the structure and shape of the surface.

Of the many technical solutions for correcting distortion of the type mentioned above, only two will be mentioned here by way of example. WO 2007/130871 A2 discloses an optical adapter for use during satellite-based image acquisition by which distortion in an acquired image can be corrected subsequently and a distortion-free final image can be provided.

A correction of distortion based on the use of reference images is disclosed in DE 103 54 752 A1, wherein a mapping function is derived from a quantity of ground control points and is used for the correction. An approach of this kind, which aims at a posterior correction of image points, is commonly applied. The information content of individual, punctiform image points of object points is modified, e.g., averaged or converted. Renderings of the object point which are largely free of distortion can be achieved by means of corrections carried out subsequent to recording, but the "identity" of an object point, i.e., its qualitative characteristics which are actually measured, is lost.

The effect of imaging errors is especially detrimental when defined object points are measured successively in time by a plurality of detectors, e.g., linear-array detectors or area-array detectors, for what is known as co-registration. Imaging errors of this kind can be superposed one upon the other, particularly when measuring in equidistant time steps.

Therefore, DE 10 2008 030 727 A1 describes a method by which imaging errors occurring during the observation of astronomical bodies by satellite-based instruments are minimized already during image acquisition. The imaging errors are caused by the surface curvature and rotational movement of the astronomical body and/or the flight motion of the observing instrument. Minimization is carried out by means of sensor pixels of different sizes and by different combinations of a plurality of detector elements varied over time. In addition, the above-mentioned methods can be applied for reducing imaging errors.

A previously known high-performance camera HRSC (High Resolution Stereo Camera) described by R. Jaumann et al., DLR Nachrichten 116, 2006, 20-27, has been used in the Mars Express probe since 2004 for three-dimensional surveying of the surface of Mars. For this purpose, a probe orbits Mars and measures characteristics of object points by means of a measuring head having nine CCD lines, of which five are used for stereo recordings and photometric recordings and the other four for recording in different spectral regions. The detectors are arranged transverse to the flight direction and parallel to one another in the image plane of an objective. Therefore, each row acquires the object points with a time offset. Each detector line has approximately 5200 pixels (detector elements) by which an object point is acquired in each instance. This high-performance camera carries out very high-precision geometric and radiometric measurements. In so doing, however, it is not evident that every object point on the surface of the astronomical body is correctly associated spatially and temporally by the corresponding detector elements of each of the nine detector lines for the subsequent superposition of the matching pixel data (co-registration). However, the correct temporal and spatial superposition of the matching pixel data cannot be ensured for all pixels because of imaging errors resulting from the differing position of the detectors in the image plane of the objective.

Aside from the above-mentioned surface-dependent imaging errors, there also occur systematic imaging errors, i.e., those depending solely on the design layout of the technical system and the interaction thereof with the characteristics of the acquired electromagnetic waves. These imaging errors are relatively minor compared to imaging errors caused by surface curvature, but they still have a very detrimental influence on the achievable quality (precise pixel-to-pixel co-registration) of the measurements.

Objects of the Invention

It is the object of the invention to find a possibility for aircraft-based and satellite-based radiometric measurement of object points on the surface of an astronomical body by which systemic imaging errors are minimized and the identities of the measurements of the object points are preserved.

In a method for air-borne or space-borne radiometric measurement of object points present in an object scene on the surface of an astronomical body which are assigned to rows and columns of an object matrix during a scanning progressing systematically in a first scanning direction and a second scanning direction, wherein the object points are imaged in an image plane on a detector as image points, and the image points inside the image plane are recorded by at least one radiation-sensitive detector element of the detector, the above-stated object is met in that, prior to the start of the measuring process, systemic imaging errors of the image points are determined, with reference to a designated measurement line along which the image points are acquired, as relative positional deviations of the image points from the measurement line, in that an actuation function is generated based on the relative positional deviations along the measurement line in the form of trigger times in which measurements of the individual object points are initiated at different times, wherein the trigger times are so defined along the measurement line that the measurement of every object point is carried out when the image point thereof corresponds spatially to a detector element assigned to the measurement line, and the actuation function is stored and made accessible to a control unit of the detector for successive measurements along the measuring path so that synchronized measurements of all object points of every row of the object matrix are carried out along the measurement line.

Systemic imaging errors within the meaning of the invention are distortions caused by the shape, size or design of the optics used for measurement. These imaging errors can be determined theoretically as well as empirically by means of a suitable test setup.

The use of the concepts of first scanning direction and second scanning direction does not imply that image points are acquired exclusively in succession. A plurality of image points can also be acquired simultaneously or in a desired sequence.

A positional relationship between object matrix and detector in which, in the absence of imaging errors, all object points of the object matrix would be imaged with an unchanged positional relationship to one another in the image plane is preferably used as a starting point for determining relative positional deviations. An arrangement of object points linearly in the object plane, e.g., along a row of the object matrix, would then likewise be imaged as a linear row of an image matrix in the image plane of the objective which could be measured in turn exactly along a measurement line. A point of the measurement line is uniquely assigned to each image point.

The first scanning direction can be the direction of a flight movement. The movement of a detector element, e.g., a scanner, in a scanning direction other than the first scanning direction, for example, transverse to the first scanning direction, can be defined as a second scanning direction.

The measurement line is advantageously defined in the image plane along the first scanning direction or second scanning direction. However, it can also comprise combinations of the first scanning direction and second scanning direction. Its shape is preferably linear, but can also be, e.g., curved or angled, and continuous or discontinuous.

Relative positional deviations are acquired with reference to a determined measurement line for each of those image points which would be imaged at least occasionally on the determined measurement line in the absence of imaging errors.

In measurement lines extending at an angle greater than zero relative to a scanning direction, the relative positional deviations of the image points are acquired with regard to two parameters: first, the distance of the image point perpendicular to the measurement line is determined for every image point and is stored; second, it is determined whether the image point under consideration has already passed (lies ahead of or leads) the measurement line, whether it lies on the measurement line, or whether it has not yet reached (lags behind) the measurement line. The relative positional deviations are acquired as a pair of values of precisely this specific spatial positional relationship of the object matrix, which is imaged in a distorted manner, and of the detector. Another position of the object matrix and detector, e.g., when another row of the object matrix is acquired, results in another data set of relative positional deviations which is specific to the row.

In further embodiments of the method according to the invention, leading and lagging can also be determined with respect to points of the measurement line. This is important when relative positional deviations occur along the measurement line.

The acquired relative positional deviations are preferably uniquely assigned in each instance to a point of the measurement line along the length of the measurement line. An assignment of this kind results in a discrete assignment which can be converted by interpolation into a—preferably continuous—actuation function.

It is also possible to express the discrete assignment of image points to points of the measurement line as a discontinuous error function. This can then be converted into a continuous error function by known mathematical rules. A continuous error function can advantageously serve as the basis for a far greater number of possible actuation functions than a discontinuous error function.

The relative positional deviation need not be acquired for every image point. A smaller quantity of image points can be sufficient for generating a discrete assignment particularly when relative positional deviations change uniformly one after the other and in case of a symmetrical distribution of the relative positional deviations along the measurement line. For example, the relative positional deviations of the image points only of every third object pixel or—with symmetrically occurring deviations—of one value per pair of symmetrically deviating image points can be acquired.

The image points can move toward the measurement line and past it due to a relative movement in at least one of the above-mentioned scanning directions. In so doing, the positional relationship of the measurement line to the image plane remains constant.

Further, the measurement line can occupy different positions in the image plane during different measuring processes. There may also be a plurality of measurement lines. For every position of the measurement line within the image plane, a discrete assignment of the relative positional deviations proper to this position can be acquired and an actuation function proper to this position can be generated.

The actuation function is generated in that, for every image point, the deviation in time of the coincidence of the image point with the measurement line which corresponds to the relative positional deviation is determined as a function value of the actuation function. In so doing, leading or lagging of the respective image points of the object points with respect to the measurement line is entered in the actuation function. The actuation function can be generated as a continuous function and as a discontinuous function.

A correction of systemic imaging errors in the first scanning direction and in the second scanning direction as well as in a combination of the two scanning directions can be carried out by means of the method according to the invention.

Further, it is possible that systematically occurring spatial and temporal changes within a scanning movement of the detector can be taken into account by the actuation function in addition to the systemic imaging errors. Changes of this kind can be, for example, systematically occurring acceleration phases and deceleration phases of a scanner which scans line by line or of a mirror scanner whose axis of rotation does not lie in the mirror plane.

In other advantageous embodiments of the method, additional, spontaneously occurring imaging errors which are not caused by systematically occurring spatial and temporal changes in a scanning movement of the detector can enter into the actuation function.

Spontaneously occurring acquisition errors can be caused, for example, by varying unpredictable (random) changes in positional relationships of the detector to the image plane (e.g., vibrations) which can originate, for example, in the movement of a unit (e.g., an aircraft) carrying the optics. Accordingly, a dynamic correction of radiometric measurements by means of a progressive adaptation of the actuation function is also possible during implementation of the method according to the invention.

Acquisition of this kind can be carried out, for example, by suitable measuring means such as position sensors or an on-board navigation system (e.g., GPS and gyroscope).

Measurements along the measurement line can be triggered separately in time for every object point along the measurement line. For this purpose, a detector element can be guided along the measurement line over the object points or an arrangement (array) of detector elements can be triggered.

An advantageous and efficient embodiment of the method according to the invention consists in that groups of selected image points are formed whose respective relative positional deviations are below a predetermined threshold, and the measurements of the object points of a group are triggered simultaneously.

Measurements of the respective groups can be triggered separately in time along the measurement line. Such groups of object points arranged in a defined manner can be object points which are arranged adjacent to one another along the measurement line or object points not adjacent to one another along the measurement line, these object points being determined in that the relative positional deviations of the image points of object points within a group differ from one another at most by a defined threshold value. Further, additional rules for forming groups are possible, and these rules can be configured dynamically, for example, so as to be adaptable to the actuation function.

In an embodiment of the method according to the invention, it is advantageous when the measurements of a plurality of non-contiguous object points or groups of object points are triggered simultaneously. Accordingly, when the relative positional deviations are distributed along the measurement line in a mirror-symmetric manner, it is advisable that measurements of object points or groups of object points which correspond to one another in a mirror-inverted manner be triggered simultaneously.

A radiometric measurement of object points or groups of object points is generally carried out over a determined spectral range. If a plurality of measurements of an object point are to be carried out in the same spectral range or in different spectral ranges, the object point can be measured a plurality of times successively (co-registration). In so doing, the actuation functions of the detectors used for co-registration are generated corresponding to the respective position of the measurement line within the image plane.

Measurements for the same object points can be triggered a plurality of times successively for different measurement lines.

Measurements of the individual object points along a measurement line can be carried out simultaneously, sequentially, or in a selected sequence.

The method according to the invention can be applied for measurements of electromagnetic waves (e.g., light) as well as for particle radiation (e.g., nuclear radiation).

The method according to the invention can advantageously be used in an integrated circuit in which each detector element of the detectors is connected to a detector control unit by a separate signal line and every detector element can be triggered individually. Further, it can be used in an integrated circuit in which groups of detector elements of the detector are connected in each instance to the detector control unit via a signal line so that measurement of a plurality of object points can be triggered simultaneously within the groups.

Further, it can advantageously be used in an above-mentioned integrated circuit in which, in addition, at least one delay element is arranged on at least one signal line in order to retard a control signal sent from the detector control unit depending on the actuation function.

Further, in an apparatus for air-borne or space-borne radiometric measurement of object points present in an object scene on the surface of an astronomical body which are assigned to rows and columns of an object matrix during a systematically progressing scanning, having optics by which the object points are imaged on a detector arranged in an image plane, wherein intensities of the imaged object points can be recorded as image points inside the image plane by a detector having at least one radiation-sensitive detector element for generating a systematically progressing imaging of the object matrix in image points, the above-stated object is met in that a storage is provided for storing an actuation function, wherein the actuation function is generated based on systemic imaging errors, and the imaging errors are determined as relative positional deviations of the image points with respect to points on a measurement line; the storage is connected to a detector control unit in order to generate control signals for the detector at trigger times from the stored actuation function in the detector control, wherein the trigger times along the measurement line are defined in such a way that measurement of every object point is carried out when the image point thereof in the image plane spatially corresponds to an associated detector element of the measurement line; and in that the detector is connected to the detector control unit in order to actuate each detector element for the recording of a respective image point at the correspondingly defined trigger time.

Depending on the radiation to be acquired, the optics can comprise lenses and beam-deflecting elements, e.g., of glass, plastic or other known materials or composites. Lenses and beam-deflecting elements of the optics can also be designed as magnetic lenses and/or electrostatic beam-deflecting elements. Further, the detector can also be suitable for detection of particle radiation as well as for detection of electromagnetic radiation. Depending upon the embodiment, the apparatus according to the invention can be used for radiometric measurements of electromagnetic radiation and particle radiation (e.g., nuclear radiation).

The detector can comprise one or more detector elements. It can be a line detector or a detector matrix having detector elements arranged in rows and columns. Further, the detector can be a pushbroom scanner or a whiskbroom scanner.

The detector lines or the rows of a detector matrix are preferably oriented orthogonal to the first scanning direction. In other advantageous embodiments of the invention, the detector elements can also be arranged in the first scanning direction.

Further, it is possible to arrange detector elements so as to be offset individually or in groups relative to one another, e.g., in a stepped manner. Accordingly, it is also possible to use and arrange large detector elements in an advantageous manner. The detector elements which are offset relative to one another advantageously lie on a plurality of measurement lines which are parallel to one another.

The triggering of the detector can be configured in a variety of ways. Each detector element can be connected to the detector control unit by a separate signal line so that each detector element can be triggered individually.

Further, it is possible that groups of detector elements of the detector are connected respectively to the detector control unit via a signal line, respectively, so that the measurement of a plurality of object points can be triggered simultaneously within the groups.

Also, the apparatus according to the invention can be constructed in such a way that at least one delay element is arranged on at least one signal line in order to retard a control signal sent from the detector control unit depending on the actuation function.

The at least one delay element can be adjusted for a determined delay. This adjustment can be carried out before, during, or after the installation of the delay element. The adjustment of the delay of the delay element can be carried out as setting a fixed value for the delay. In further embodiments, the at least one delay element can also be programmable so that the programmable delay can be adjusted in a fixed manner and can also be dynamically adapted during operation of the apparatus. The latter embodiment is advantageous particularly when spontaneously occurring contributions to the relative positional deviations of the image points must be taken into account.

Further, it is possible that the detector is connected to the detector control unit via a signal bus and has addressable detector elements which can be triggered individually or in groups by means of addressed signals. A system of addressable detector elements and addressed signals of this kind can be realized, for example, by a serial bus system such as is known from control engineering. The advantages of a construction of this kind include the small quantity of required signal lines and the capability of a flexible and dynamic triggering of individual detector elements or groups of detector elements.

The possible embodiments of the apparatus according to the invention mentioned above can also be realized as integrated circuits (chips).

An actuation function can be generated, for example, by an analog generator, a digital generator, or a digital table.

BRIEF DESCRIPTION OF THE DRAWINGS

The invention will be described more fully in the following with reference to embodiment examples and drawings. The drawings show.

DESCRIPTION OF THE EMBODIMENTS

Figure 1:
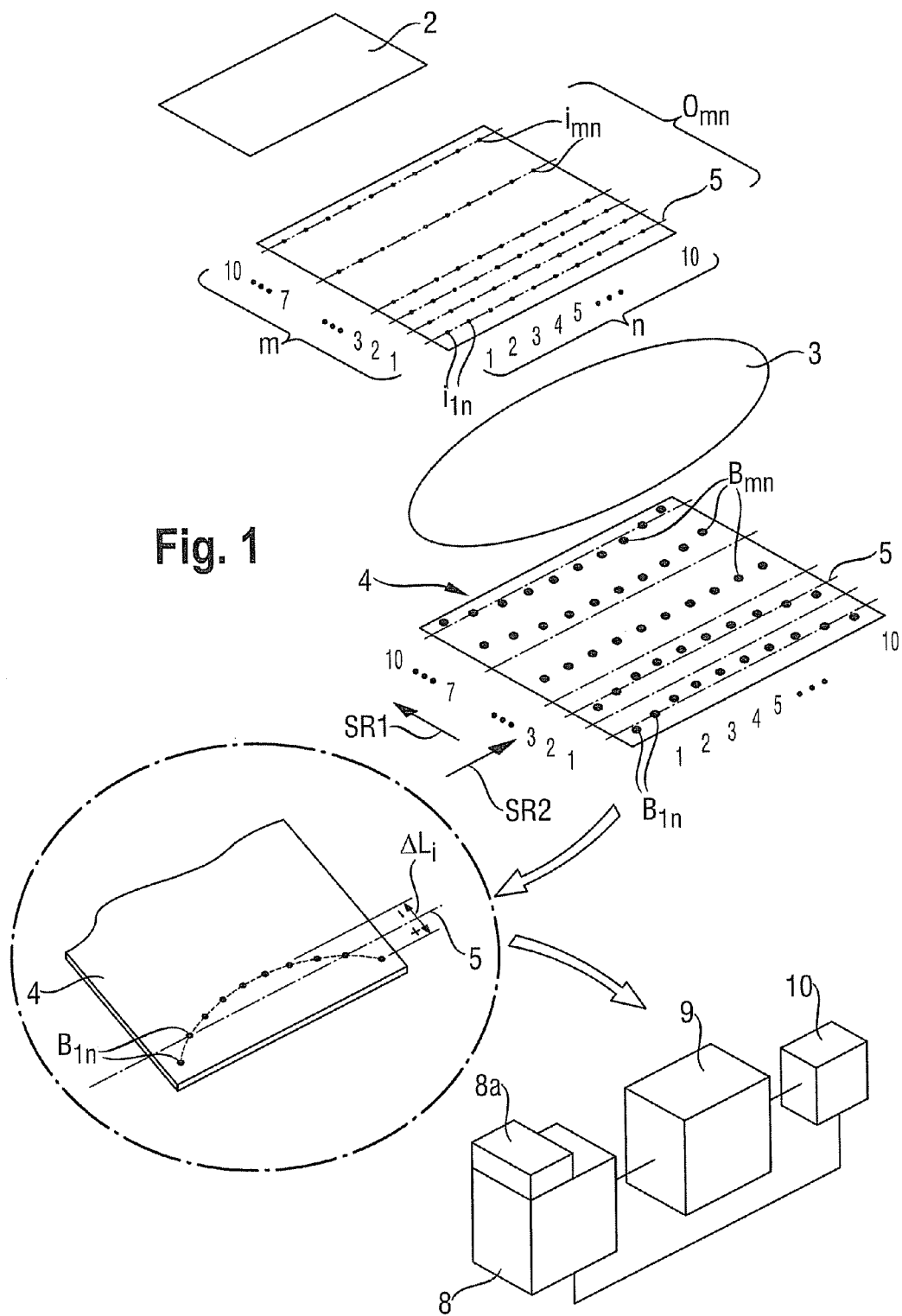
FIG. 1 is the principle of the invention shown in a schematic overview illustrating how imaging is carried out.

According to FIG. 1, the essential elements in a first embodiment of the apparatus according to the invention comprise optics 3 by which object points imn of an object 1 which is located on the surface of an astronomical body and in an object scene 2 are assigned to rows m and columns n of an object matrix $O_{mn}$ and imaged in an image plane 4 as image points $B_{mn}$ during a scanning progressing in a first scanning direction SR1. A detector 8 is provided which is constructed as a whiskbroom scanner by means of which image points $B_{mn}$ in the image plane 4 can be recorded along a linear measurement line 5. The detector 8 communicates with a detector control unit 9 and a storage 10. The detector 8 has a detector element 8a which is guided in a second scanning direction SR2 along the measurement line 5, which is parallel to rows m, and records the image points $B_{mn}$. The detector element 8a is guided in the first scanning direction SR1 successively over the individual rows m.

In other embodiments of the invention, the detector 8 can be a scanner rotating around an axis such as a Schiefspiegler telescope having half-angle mirrors of finite thickness or a pushbroom scanner. Different quantities of detector elements can be provided which, further, can scan different rows m.

For the sake of clarity, the image points Bmn are shown by way of example in FIG. 1 in ten rows m (m=1 . . . 10) and ten columns n (n=1 . . . 10) of the object matrix Omn. Linearly shaped measurement lines 5 are arranged so as to extend parallel to the rows m of the object matrix $O_{mn}$ and in the direction of the second scanning direction SR2.

At the time shown in the drawing, the measurement line 5 is adjusted in such a way that, in the absence of systemic imaging errors, all of the image points $B_{in}$ of object matrix $i_{in}$ of the first row m (m=1) would coincide spatially with measurement line 5. Actually, however, the image points $B_{in}$ along the measurement line 5 in the image plane 4 have relative positional deviations $\Delta L_i$ with respect to the measurement line 5.

These relative positional deviations $\Delta L_i$ are acquired by suitable measuring means and measuring methods as perpendicular distances of the individual image points $B_{mn}$ from the points $P_i$ of the measurement line 5 which are assigned to them and are stored. This can be carried out in such a way, for example, that light points along a raster of straight lines are projected on the optics 3 and imaged as reference points. A CCD measuring camera is arranged in the image plane 4 and measures the position of the imaged reference points in the image plane 4 in a highly precise manner. The relative positional deviations $\Delta L_i$ are determined from the deviation of a reference position and an actual position. In addition, all of the relative positional deviations $\Delta L_i$ of image points $B_{in}$ in which the image points $B_{mn}$ have already passed the measurement line 5, i.e., lead the measurement line 5, in the first scanning direction SR1 are indicated by a positive sign "+", while all of the relative positional deviations $\Delta L_i$ in which the image points $B_{mn}$ have not yet passed the measurement line 5, i.e., lag behind the measurement line 5, are indicated by a negative sign "−".

Figure 2A:
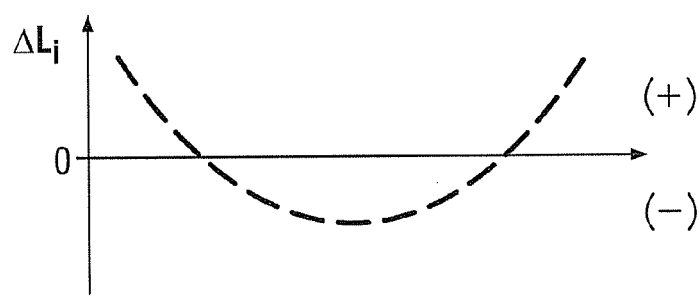
FIG. 2 is a schematic graph showing a) the relative positional deviations along a measurement line, b) a generated discontinuous and continuous error function, and c) an actuation function generated from the error function.
Figure 2B:
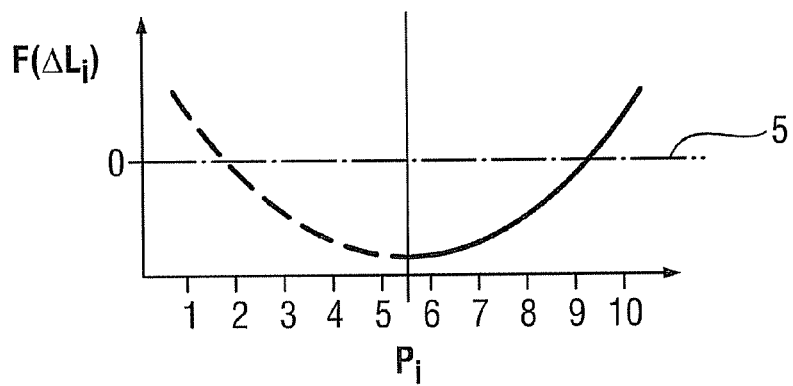

The relative positional deviations $\Delta L_i$ occurring along the measurement line 5 are each uniquely assigned to a point $P_i$ of the measurement line 5 according to FIG. 2a so that a discrete assignment (which can also be expressed as a discontinuous error function) of the relative positional deviations $\Delta L_i$ relative to points $P_i$ results along the measurement line 5 as is shown in the left-hand half of FIG. 2b. By interpolating the individual relative positional deviations $\Delta L_i$ of the discrete assignment of the image points $B_{mn}$, the discrete assignment can (optionally) be converted to a continuous error function $F(\Delta L_i)$ as is shown in the right-hand half of FIG. 2b. In the example shown in FIG. 2, the error function $F(\Delta L_i)$ which is shown schematically has zero points (y=0) at x=2 and 9 and a vertex at x=5.5.

An actuation function $A(\Delta L_i)$ is now generated in that the relative positional deviations $\Delta L_i$ are converted into time differences $\Delta t$ using the known speed of the scan in the second scanning direction SR2, but the sign is retained in each instance (leading image points $B_{mn}$ have positive signs, lagging image points $B_{mn}$ have negative signs). A time $t_0$ is defined as reference time for the measurement line 5. At this time $t_0$, all those image points not subject to systemic imaging errors (in this case, $B_{12}$ and $B_{19}$) coincide with the measurement line 5. In further embodiments of the invention, the actuation function $A(\Delta L_i)$ can also be generated using the error function $F(\Delta L_i)$.

Figure 2C:
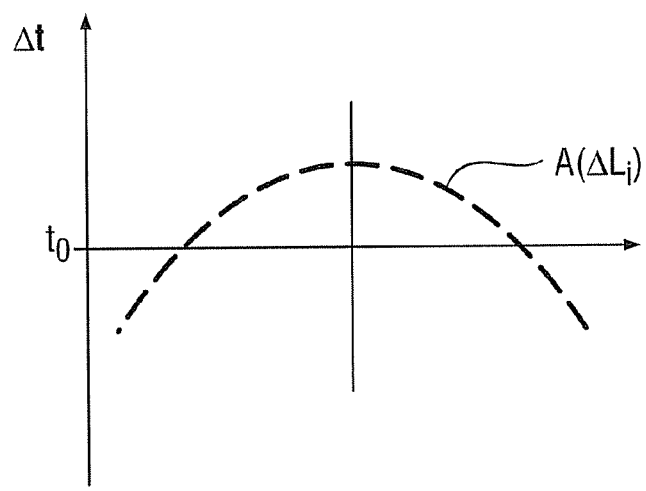

A time difference $\Delta t$ is assigned to every point Pi of the measurement line 5. Leading image points $B_{mn}$ already coincide with the measurement line 5 before time $t_o$, lagging image points $B_{mn}$ coincide with the measurement line 5 later than time $t_0$. A trigger time is defined for each point $P_i$ of the measurement line 5 by subtracting the respective time difference $\Delta t$ of point $P_i$ from $t_0$. In this regard, time differences $\Delta t$ having a positive sign result in trigger times before time $t_0$, while time differences $\Delta t$ having negative signs result in trigger times after time $t_0$ as is shown in FIG. 2c. The actuation function $A(\Delta L_i)$ is accordingly generated as an assignment of trigger times to points $P_i$ of the measurement line 5.

When a correction of radiometric measurements is carried out in the second scanning direction SR2 in another embodiment of the invention, the signs are allocated in a corresponding manner. If recording fields 6 lie alongside the measurement line 5 rather than on the measurement line 5, their relative positional deviations $\Delta L_i$ are determined in a corresponding manner. For this purpose, the rules of vector calculation can be used, particularly when corrections are carried out in the first scanning direction SR1 and second scanning direction SR2.

Figure 3:
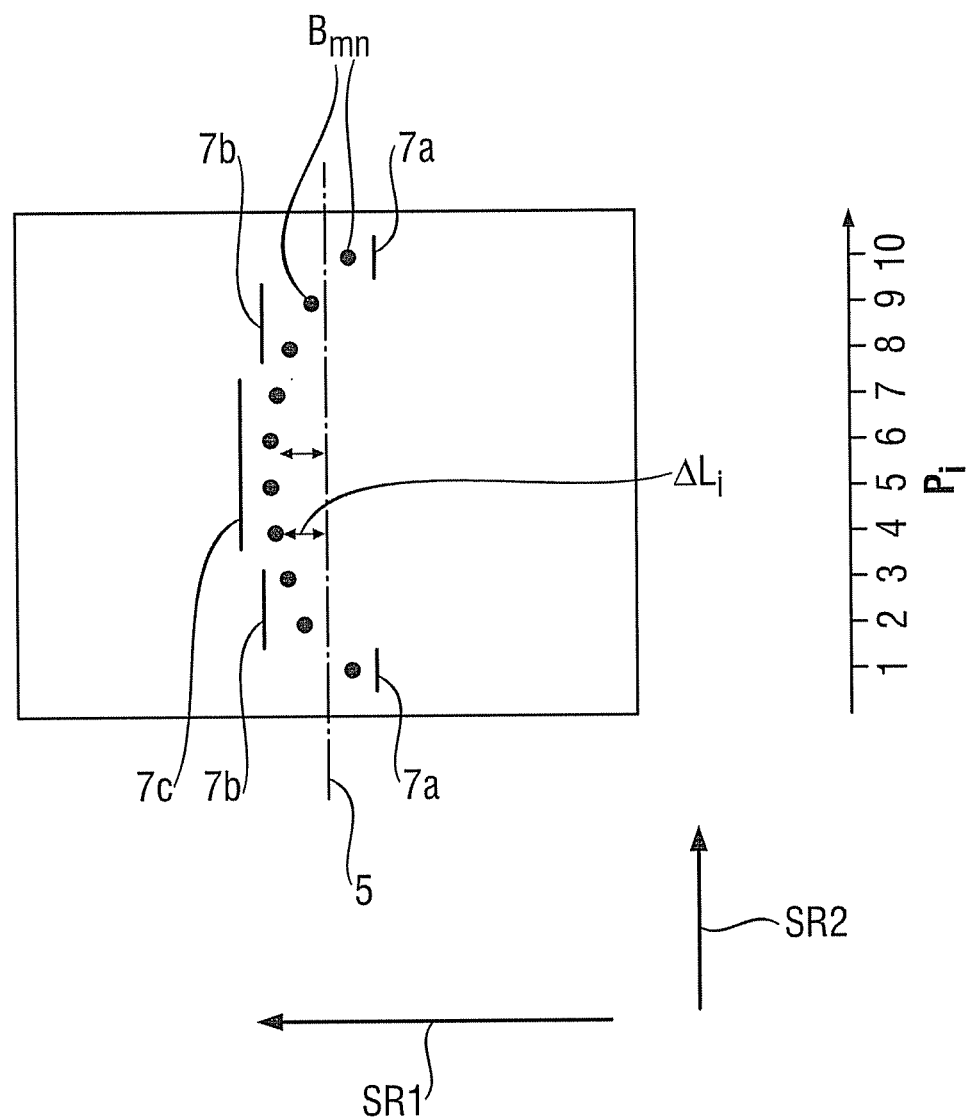
FIG. 3 is a schematic graph showing image points and groups of image points.

In a modified embodiment of the method according to the invention which is shown in FIG. 3, groups of object points $i_{mn}$ can be assembled in which the relative positional deviations $\Delta L_i$ of their image points $B_{mn}$ differ by no more than a given threshold value.

To illustrate this situation, image points $B_{mn}$ are shown whose relative positional deviations $\Delta L_i$ from measurement line 5 are arranged in a mirror-symmetric manner with respect to an orthogonal line extending through the center of the measurement line 5. With respect to amount and sign, the positional deviations $\Delta L_i$ of image points $B_{mn}$ are identical at the points $P_i$ at i=1 and i=10 which do not lie adjacent. The differences of the relative positional deviations $\Delta L_i$ of the image points $B_{mn}$ at the respective adjacent points $P_i$ at i=2 and i=3 and at i=8 and i=9 do not exceed a determined threshold value (e.g., threshold value=1). The relative positional deviations $\Delta L_i$ of the image points $B_{mn}$ at points $P_i$ at i=4, 5, 6 and 7 are likewise below a predetermined threshold value (0.5).

A time difference $\Delta t$ and a trigger time are assigned to the above-described groups 7a, 7a'; 7b, 7b'; 7c, respectively, and are calculated based on a mean relative positional deviation $\Delta Li$ of the respective group 7a, 7a'; 7b, 7b'; 7c.

The generated actuation function $A(\Delta L_i)$ relates to the group 7a and 7a' of corresponding image points $B_{mn}$ of the points $P_i$ at i=1 and i=10 and the group 7b and 7b' of corresponding image points $B_{mn}$ of the points $P_i$ at i=2; 3 and i=8; 9, and to the group 7c comprising image points $B_{mn}$ of contiguous points $P_i$ at i=4; 5; 6; 7).

It is useful to determine the groups 7a, 7a'; 7b, 7b'; 7c based on the time differences $\Delta t$ or resulting trigger times.

Figure 4A:
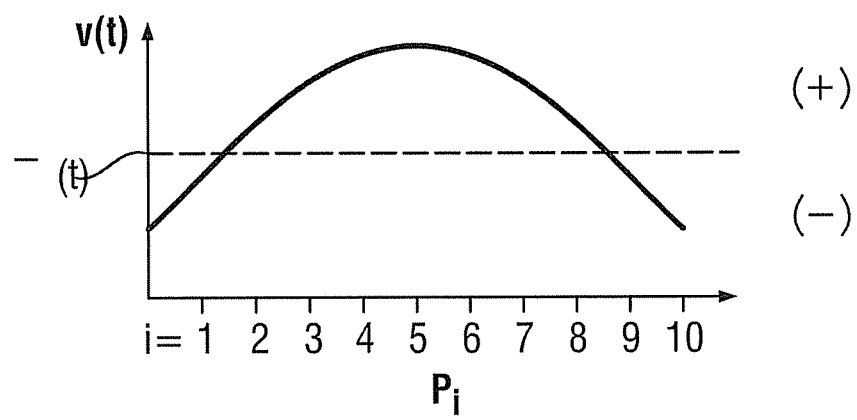
FIG. 4 is a schematic view of a) a systematically nonlinear temporal movement sequence of a scanner, and b) an actuation function of the trigger times which is necessary to compensate for the nonlinear scanning movement.
Figure 4B:
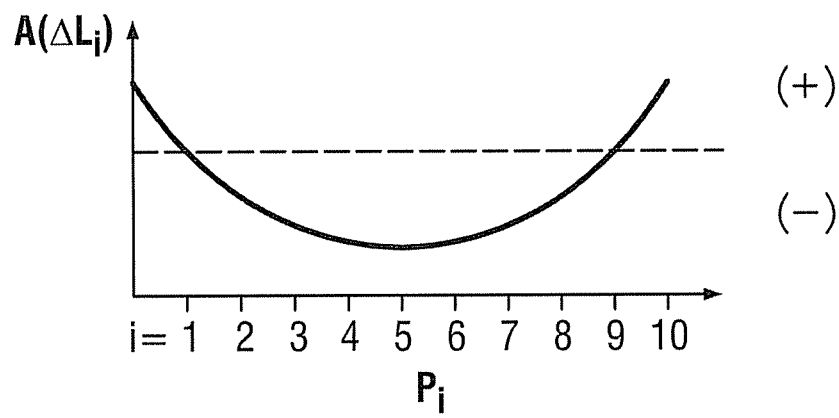

When systematic spatial and/or temporal changes also occur in a scanning movement of the detector 8 in addition to the systemic optical imaging errors, they can also be taken into account in the actuation function $A(\Delta L_i)$. In an embodiment of the invention according to FIG. 4a, a change occurs in the scanning movement in the form of a mirror-symmetric, parabolic curve of the movement speed of a scanner arranged as detector 8. Such a change in movement speed can be caused by an acceleration and deceleration of the scanner during the acquisition of image points $B_{mn}$ along the measurement line 5. In this case, the movement speed swings around a mean movement speed $V_X$ and can be entered (not shown) as a contribution in the relative positional deviations $\Delta L_i$. An actuation function $A(\Delta L_i)$ resulting from this change in the scanning movement is shown schematically in FIG. 4b and could overlap the actuation function $A(\Delta L_i)$ according to FIG. 2c.

Figure 5A:
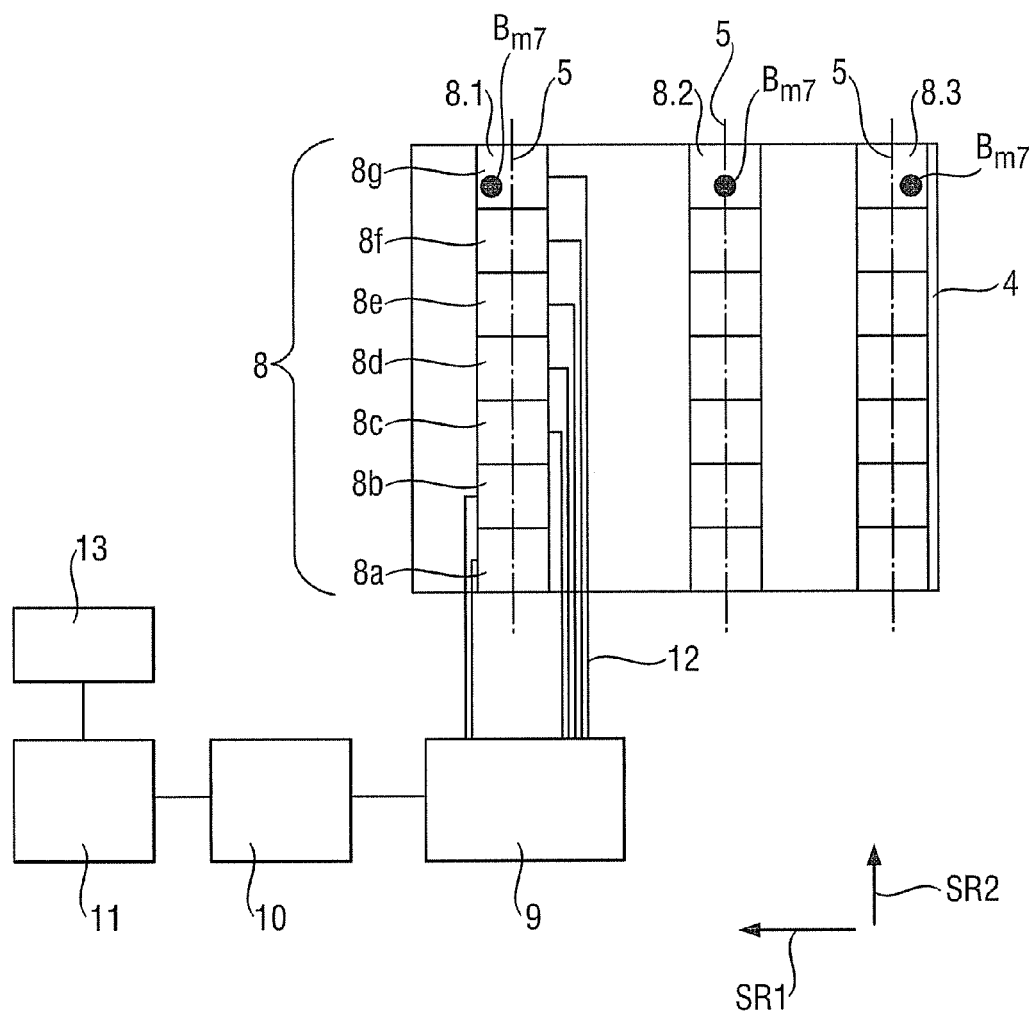
FIG. 5 is a schematic representation of a) an embodiment of the apparatus according to the invention having separate signal lines for individual detector elements or groups of detector elements, b) an alternative embodiment with a serial bus system, and c) a schematic view of an embodiment with delay elements.

As is shown schematically in FIG. 5a, the actuation function $A(\Delta L_i)$ is generated by means of a function generator 11, stored in the storage 10 and translated into control signals by the detector control unit 9. The measurements of the object points $i_{mn}$ are triggered at the trigger times generated by the actuation function $A(\Delta L_i)$ along measurement line 5 by means of the detector control unit 9 which is connected to the detector 8.

Deviations from the standard parameters (e.g., flight speed, flight altitude, etc.) caused by the drive unit 13 are sent to the function generator 11 and enter into the actuation function $A(\Delta L_i)$.

The detector control unit 9 triggers time-offset measurements of the object points $i_{mn}$ of an object matrix $O_{mn}$ imaged in a distorted manner in the image plane 4 when the associated image points $B_{mn}$ reach a predetermined measurement line 5 and can be read out from one of the seven detector elements 8a to 8g. The acquired measured values of the object points $i_{mn}$ are then stored in the storage 10 and are accessible therein for further evaluations (e.g., co-registration) and for forwarding to another data processing unit (not shown).

In an embodiment of the apparatus according to the invention according to FIG. 5a, the detector 8 comprises three line detectors, namely, a first, a second and a third line detector 8.1 to 8.3, each of which is outfitted with seven detector elements 8a to 8g (array) for the sake of simplifying the illustration. The line detectors 8.1 to 8.3 are arranged parallel to the path of the rows m of the object matrix $O_{mn}$ in the second scanning direction SR2 and orthogonal to the first scanning direction SR1. A measurement line 5 is associated with each line detector 8.1 to 8.3. Each detector element 8a to 8g is connected by its own signal line 12 to the detector control unit 9 (shown only for the first line detector 8.1) which in turn communicates via a storage 10 with a function generator 11 and a drive unit 13. Without limiting generality, the drive unit 13 in this instance is an aircraft whose flight movement relative to the Earth's surface causes a movement along the first scanning direction SR1 between measurement line 5 and object matrix $O_{mn}$. However, the drive unit 13 can also be a satellite, a spacecraft, an unmanned flying object, or a scanner. Naturally, radiometric measurements can also be carried out not only on Earth, but on the surfaces of all other astronomical bodies.

It is also possible, as is shown in FIG. 3, that detector elements 8a to 8g of the kind mentioned above which are triggered in common based on slight relative positional deviations $\Delta Li$ and which are closely adjacent have shared signal lines 12, respectively, by which a group 7 of object points imn can be measured in each instance.

The arrangement of the detector elements 8a to 8g in relation to the first scanning direction SR1 and second scanning direction SR2 can also be carried out differently, e.g., obliquely, angled, or curved, in other embodiments of the invention.

Figure 5B:
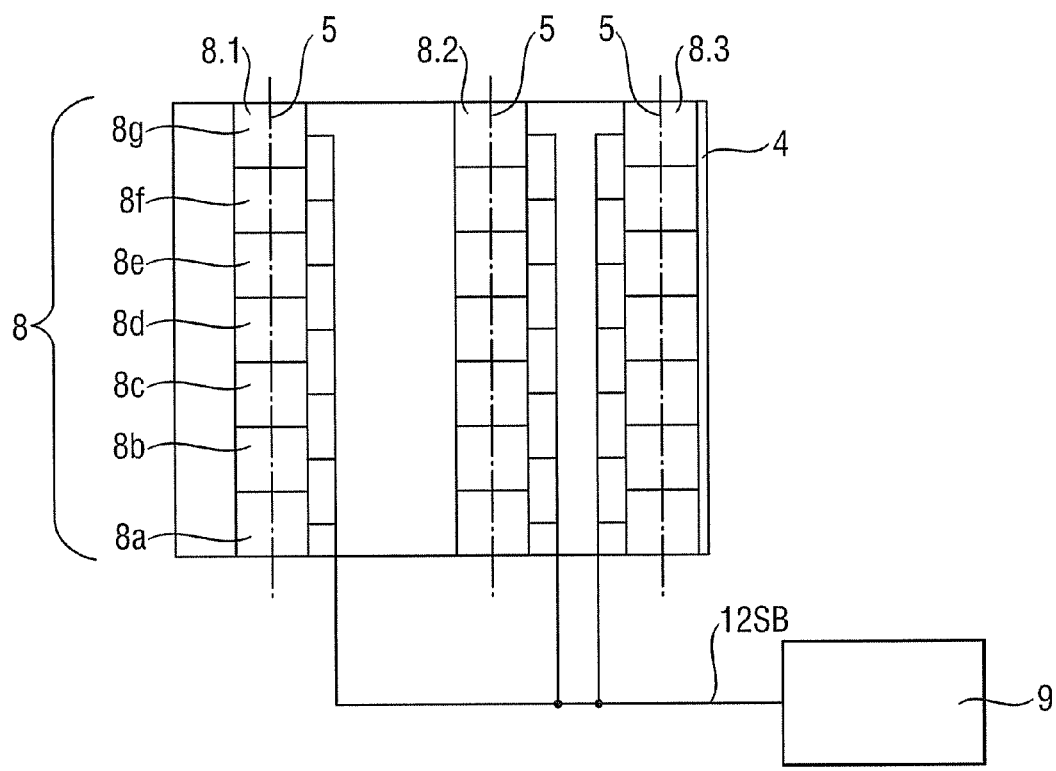

In another embodiment of the apparatus according to FIG. 5b, the individual detector elements 8a to 8g are constructed so as to be individually addressable and are connected to the detector control unit 9 via a shared signal bus 12SB. The individual detector elements 8a to 8g of the line detectors 8.1 to 8.3 can be triggered individually and independently from one another or in common in groups by means of addressed signals. Further, a time delay can be assigned via a signal bus 12SB to every detector element 8a to 8g or to every group of detector elements 8a to 8g corresponding to the actuation function $A(\Delta L_i)$, a respective trigger time being shifted in relation to a shared trigger signal (control signal) corresponding to this time delay.

Figure 5C:
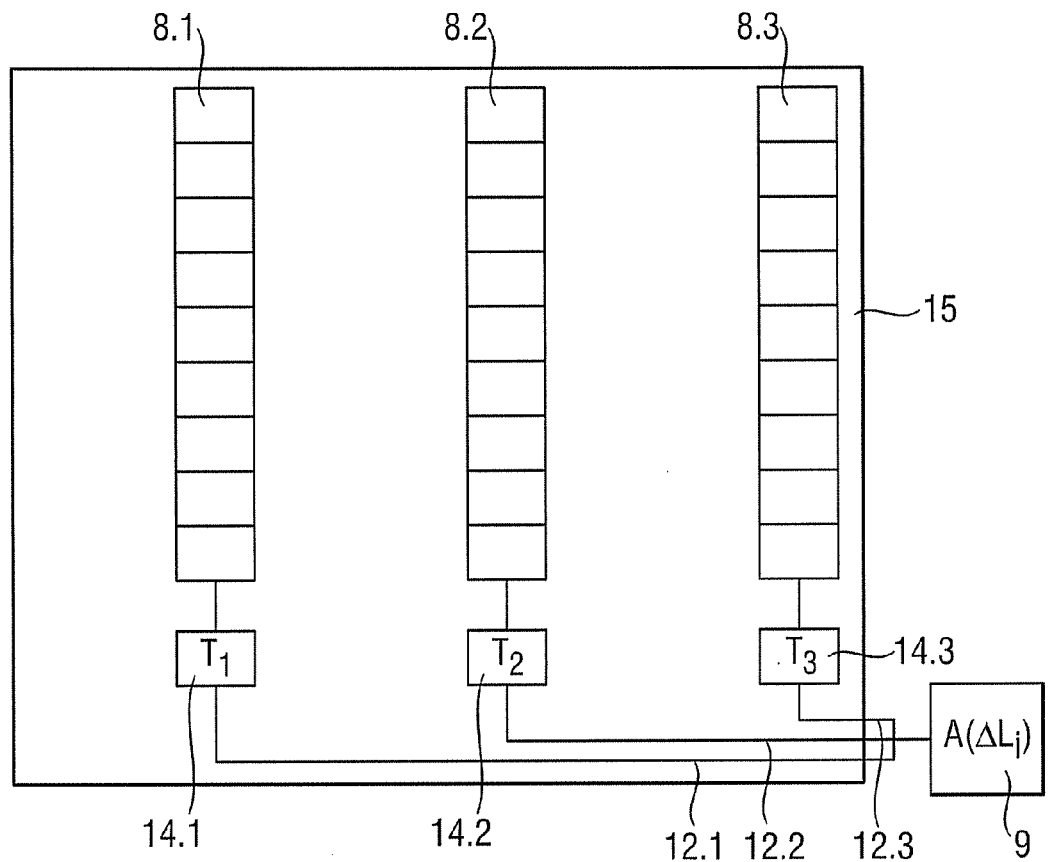

To actuate the detector elements 8a to 8g of the line detectors 8.1 to 8.3, every line detector 8.1 to 8.3 is arranged on a chip 15 (integrated circuit) in another embodiment of the apparatus, as is shown in FIG. 5c, and is connected to the detector control unit 9 in each instance by a delay element 14.1 to 14.3 and by a signal line 12.1 to 12.3. Each delay element 14.1 to 14.3 causes a delay T1 to T3 of the control signals sent from the detector control unit 9 to the individual line detectors 8.1 to 8.3, which delay T1 to T3 is specific to and programmable for the line detectors 8.1 to 8.3. Therefore, a control signal which is sent from the detector control unit 9 to all line detectors 8.1 to 8.3 simultaneously is delayed depending on the actuation function $A(\Delta L_i)$, and the line detectors 8.1 to 8.3 are triggered individually, respectively, at a defined trigger time. All of the detector elements 8a to 8g of a line detector 8.1 to 8.3 are triggered simultaneously with the programmable delay T1 to T3.

In other constructions, delay elements 14.1 to 14.3 can be provided in front of every detector element 8a to 8g of the line detectors 8.1 to 8.3 or only on signal lines 12 and 12.1 to 12.3 of individual line detectors 8.1 to 8.3 and/or detector elements 8a to 8g. Further, delay elements 14.1 to 14.3 can also be logically assigned to groups of object points $i_{mn}$. The detector control unit 9 can likewise be arranged on the chip 15. Also, individual delay elements 14.1 to 14.3 or all of the delay elements 14.1 to 14.3 can be arranged outside the chip 15.

Image point $B_{m7}$ of the object point $i_{m7}$ will be considered during its passage through the imaging plane 4 in direction of the first scanning direction SR1 in order to explain the taking of measurements with the embodiment of the apparatus according to FIG. 5a.

Specific actuation functions $A(\Delta L_i)$ are generated according to the steps described above for the respective line detectors 8.1 to 8.3 and are stored in the storage 10 in repeatedly retrievable form. Because of systemic imaging errors, image point $B_{m7}$ leads the linear measurement line 5 of the first line detector 8.1, i.e., it has a relative positional deviation $\Delta L_i$ having a positive sign. Therefore, the measurement line 5 of object point $i_{m7}$ is triggered by the detector control unit 9 at a trigger time preceding time $t_0$ of measurement line 5 of the first line detector 8.1 when image point $B_{m7}$ coincides prematurely with measurement line 5 of the first line detector 8.1.

No systemic imaging errors were determined along measurement line 5 of the second line detector 8.2. Therefore, the measurement is triggered at a trigger time that is identical to time $t_0$ of the measurement line 5 of the second line detector 8.2. Every detector element 8a to 8g of the second line detector 8.2 is actuated individually by the detector control unit 9 and the respective signal line 12, but the measurements are triggered simultaneously.

In the measurement line 5 of the third line detector 8.3, image point $B_{m7}$ lags behind the measurement line 5 of the third line detector 8.3 due to systemic imaging errors and has a relative positional deviation $\Delta L_i$ having a negative sign. Therefore, the measuring of object point $i_{m7}$ is initiated by the detector control unit 9 at a trigger time which occurs at a later time than time $t_0$ of measurement line 5 of the third line detector 8.3 when image point $B_{m7}$ is belatedly superposed on the measurement line 5 of the third line detector 8.3. The detector elements 8a to 8g of the third line detector 8.3 are also actuated individually by the detector control unit 9 and the respective signal line 12 and the measurement is triggered.

An image point $B_{m7}$ of object point $i_{m7}$ is recorded once in each instance (co-registered) by each of the line detectors 8.1 to 8.3 so that there is a total of three measurements of the object point $i_{m7}$ which are stored in the storage 10 and made accessible for further evaluation. Naturally, this illustration of the method step presented by way of example applies to all image points $B_{mn}$.

In other embodiments of the apparatus according to the invention, a different quantity of line detectors can be provided. The line detectors 8.1 to 8.3 can also be part of a detector matrix. In further embodiment examples, the line detectors 8.1 to 8.3 can also be aligned in direction of the first scanning direction SR1. A measurement line 5 can then also extend parallel to the rows m of object matrix $O_{mn}$, but the measurements along the measurement line 5 would then be carried out by detector elements 8a to 8g which belong to different line detectors 8.1 to 8.3.

The line detectors 8.1 to 8.3 can be sensitive to radiation of spectral regions that differ from one another so that, particularly during co-registration, the individual radiometric measurements of object points $i_{mn}$ and/or rows m of the object matrix $O_{mn}$ can be carried out in different spectral regions.

In an embodiment of the invention having a detector constructed as a rotating scanner, the method according to the invention and the apparatuses according to the invention can compensate for imaging errors which occur in spite of a constant rate of rotation of the scanner due to a position of half-angle mirrors of the scanner outside of an axis of rotation of the scanner.

Further, imaging errors perpendicular to the scanning direction can be compensated when using line detectors or arrays of detectors.

The method according to the invention and the apparatuses according to the invention can be used in all applications of optically imaging systems in which an accurate point-by-point measurement is required. In particular, the invention is suitable for applications in the fields of air-borne or space-borne remote sensing and meteorology.

REFERENCE NUMERALS 1 object
2 object scene
3 optics
4 image plane
5 measurement line
7a, 7a' groups
7b, 7b' groups
7c group
8 detector
8.1 first line detector
8.2 second line detector
8.3 third line detector
8a to 8g detector elements
9 detector control
10 storage
11 function generator
12 signal lines
12.1 to 12.3 signal lines
12SB signal bus
13 drive unit
14.1 to 14.3 delay element
15 chip SR1 first scanning direction
SR2 second scanning direction
$O_{mn}$ object matrix
m rows
n columns
$i_{mn}$ object point
$B_{mn}$ image point
$\Delta L_i$ relative positional deviation
$F(\Delta L_i)$ error function
$A(\Delta L_i)$ actuation function
T1 to T3 programmable delay
$P_i$ point
$\Delta t$ time difference
$t_0$ time
$v(t)$ movement speed
$\overline{u}(t)$ mean movement speed

What is claimed is:

1. A method for air-borne or space-borne radiometric measurement of object points $i_{mn}$ present in an object scene on a surface of an astronomical body which points are assigned to rows m and columns n of an object matrix $O_{mn}$ during a scanning progressing systematically in a first scanning direction and a second scanning direction, comprising the steps of:
    imaging the object points $i_{mn}$ into an image plane on a detector as image points $B_{mn}$;
    recording the image points $B_{mn}$ inside the image plane by at least one radiation-sensitive detector element of the detector;
    determining, prior to the start of a measuring process, systemic imaging errors of the image points $B_{mn}$ with reference to a designated measurement line along which the image points $B_{mn}$ are acquired, as relative positional deviations $\Delta L_i$ of the image points $B_{mn}$ from the measurement line;
    generating an actuation function $A(\Delta L_i)$ based on the relative positional deviations $\Delta L_i$ along the measurement line in the form of trigger times in which measurements of the individual object points $i_{mn}$ are initiated at different times, wherein the trigger times are so defined along the measurement line that the measurement of every object point $i_{mn}$ is carried out when the image point $B_{mn}$ thereof corresponds spatially to a detector element assigned to the measurement line;
    storing the actuation function $A(\Delta L_i)$ and making it accessible to a detector control unit associated with the detector for successive measurements along the measurement; and
    carrying out synchronized measurements of all of the object points of every row $i_{mn}$ of the object matrix $O_{mn}$ along the designated measurement line based on the triggering of detector elements due to the actuation function $A(\Delta L_i)$.

2. The method according to claim 1, wherein systematically occurring spatial and temporal changes in a scanning movement of the detector are taken into account by the actuation function $A(\Delta L_i)$ in addition to the systemic imaging errors.

3. The method according to claim 1, wherein groups of selected image points $B_{mn}$ are formed whose respective relative positional deviations $\Delta L_i$ are less than a predetermined threshold value, and measurements of the object points $i_{mn}$ of a group are triggered simultaneously.

4. The method according to claim 1, wherein measurements for the same object points $i_{mn}$ are triggered a plurality of times successively for different measurement lines.

5. The method according to claim 4, wherein spontaneously occurring contributions to the relative positional deviations $\Delta L_i$ of the image points $B_{mn}$ are acquired and are taken into account when generating the actuation function $A(\Delta L_i)$.

6. Use of the method according to claim 1 by an integrated circuit, wherein each detector element of the detector is connected to a detector control unit by a signal line, respectively, and each detector element can be triggered individually.

7. Use of the method according to claim 6, wherein at least one delay element is arranged in at least one signal line in order to retard a control signal sent from the detector control unit depending on the actuation function $A(\Delta L_i)$.

8. Use of the method according to claim 1 by an integrated circuit, wherein groups of detector elements of the detector are connected, respectively, to a detector control unit via a signal line, respectively, so that measurement of a plurality of object points $i_{mn}$ can be triggered simultaneously within the groups.

9. Use of the method according to claim 8, wherein at least one delay element is arranged in at least one signal line in order to retard a control signal sent from the detector control unit depending on the actuation function $A(\Delta L_i)$.

10. An apparatus for air-borne or space-borne radiometric measurement of object points $i_{mn}$ present in an object scene on the surface of a astronomical body which are assigned to rows m and columns n of an object matrix $O_{mn}$ during a systematically progressing scanning, comprising:
    an optics by which the object points $i_{mn}$ are imaged into an image plane;
    a detector arranged in the image plane of the optics having at least one radiation-sensitive detector element for generating a systematically progressing imaging of the object matrix $O_{mn}$ in image points $B_{mn}$, wherein intensities of the imaged object points $i_{mn}$ can be recorded as the image points $B_{mn}$ inside the image plane by the detector;
    a storage being provided for storing an actuation function $A(\Delta L_i)$, wherein the actuation function $A(\Delta L_i)$ is generated based on systemic imaging errors and the imaging errors are determined as relative positional deviations $\Delta L_i$ of the image points $B_{mn}$ with respect to a designated measurement line within the image plane,
    a detector control unit for generating control signals for the detector, wherein the detector control unit being connected to the storage in order to generate control signals for the detector at trigger times from the stored actuation function $A(\Delta L_i)$ in the detector control, the trigger times along the measurement line being defined in such a way that measurement of every object point $i_{mn}$ is carried out when the image point $B_{mn}$ thereof in the image plane spatially corresponds to an associated detector element of the measurement line, and the detector control unit is connected to the detector in order to actuate each detector element for the recording of a respective image point $B_{mn}$ at the correspondingly defined trigger time.

11. The apparatus according to claim 10, wherein each detector element is connected to the detector control unit by a separate signal line so that each detector element can be triggered individually.

12. The apparatus according to claim 10, wherein groups of detector elements of the detector being connected, respectively, to the detector control unit via a signal line, respectively, so that the measurement of a plurality of object points $i_{mn}$ can be triggered simultaneously within the groups.

13. The apparatus according to claim 10, wherein the detector elements are connected to the detector control unit via signal lines and at least one delay element is arranged on at least one signal line to retard a control signal sent from the detector control unit depending on the actuation function $A(\Delta L_i)$.

14. The apparatus according to claim 13, wherein the at least one delay element can be adjusted for a determined delay.

15. The apparatus according to claim 10, wherein the detector is connected to the detector control unit via a signal bus and has addressable detector elements which can be triggered individually or in groups by means of addressed signals.

16. The apparatus according to claim 10, wherein lenses and beam-deflecting elements of the optics are constructed as magnetic lenses and/or electrostatic beam-deflecting elements, and the detector is suitable for detection of particle radiation.

* * * * *